United States Patent
Huffman et al.

(10) Patent No.: US 9,967,512 B2
(45) Date of Patent: May 8, 2018

(54) PORTABLE ENTERTAINMENT SYSTEM

(71) Applicants: Scott Huffman, Delaware, OH (US);
Mark Huffman, Delaware, OH (US)

(72) Inventors: Scott Huffman, Delaware, OH (US);
Mark Huffman, Delaware, OH (US)

(*) Notice: Subject to any disclaimer, the term of this patent is extended or adjusted under 35 U.S.C. 154(b) by 163 days.

(21) Appl. No.: 14/838,523

(22) Filed: Aug. 28, 2015

(65) Prior Publication Data
US 2016/0065883 A1    Mar. 3, 2016

Related U.S. Application Data

(60) Provisional application No. 62/043,457, filed on Aug. 29, 2014.

(51) Int. Cl.
*H04N 5/645* (2006.01)
*H04N 5/655* (2006.01)
*B60P 3/07* (2006.01)

(52) U.S. Cl.
CPC ............. *H04N 5/645* (2013.01); *H04N 5/655* (2013.01)

(58) Field of Classification Search
CPC ........ B60R 2011/004; B60R 9/06; H04N 5/64
See application file for complete search history.

(56) References Cited

U.S. PATENT DOCUMENTS

| 6,814,383 B2 | 11/2004 | Reed, III et al. | |
| 8,231,036 B2* | 7/2012 | Campbell | B60R 9/065 224/42.32 |
| 2008/0231067 A1* | 9/2008 | Nagle | B60P 3/07 296/50 |

OTHER PUBLICATIONS https://m.youtube.com/watch?v=PpY_53WDZKw (Hitch N View Tow Hitch TV Mount), Uploaded on Nov. 2, 2011.
http://www.prolineracks.com/hitch-cargo-box-carriers.html, ProlineRacks.
https://m.youtube.com/watch?v=H4Vz0vwVh20 (Ultimate Tailgating Grill—Stereo Cooler Draft Beer & Grill), Published Jun. 13, 2012.
http://www.tailgatelot.com/content/the-all-in-one-tow-hitch-grill-and-cooler-tailgating-system.html, The All-In-One Tow-Hitch Grill and Cooler Tailgating System, tailgatelot.com, Aug. 27, 2009.
http://gizmodo.com/5020566/party-a-cargo-brings-the-bro-down-to-wherever-your-truck-can-park, Party-A-Cargo Brings the Bro-Down to Wherever Your Truck Can Park, Elaine Chow, Jun. 29, 2008.
http://www.autoanything.com/tailgating-accessories/party-king-grills-roadshow-portable-entertainment-system.

* cited by examiner

*Primary Examiner* — Obafemi Sosanya
(74) *Attorney, Agent, or Firm* — Timothy D. Bennett; Emerson Thomson Bennett

(57) ABSTRACT

A portable entertainment system may include a housing, a television and at least one table. The table may be adjustable between a first condition where it forms a portion of the housing and a second condition where table legs are used to support a tabletop onto a ground surface. The television may include a monitor that is adjustable between a first position within the housing interior and a second position outside the housing interior where it is operable for television viewing.

20 Claims, 17 Drawing Sheets

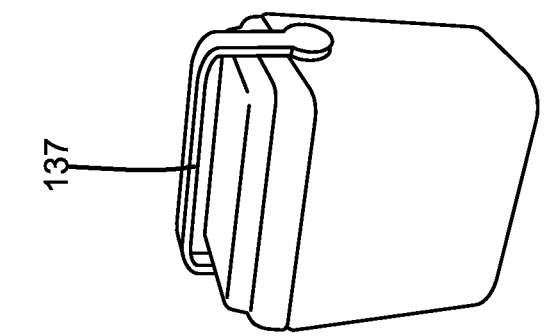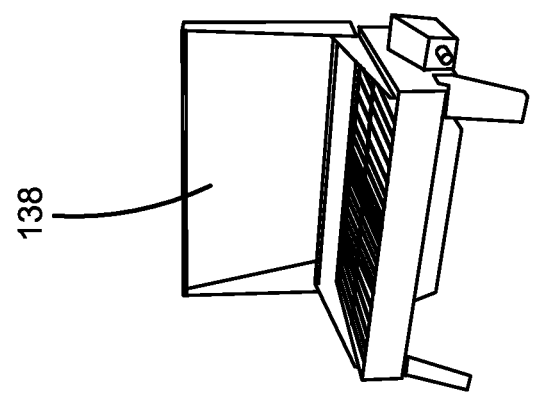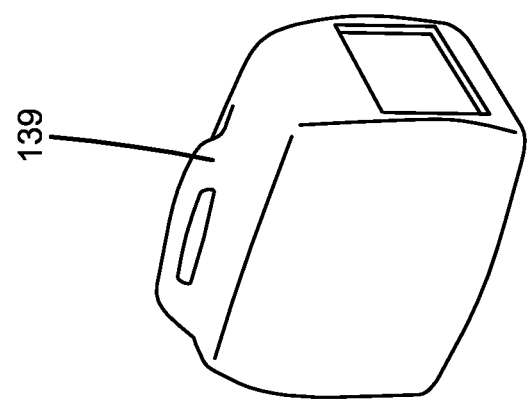
FIG. 17

PORTABLE ENTERTAINMENT SYSTEM

I. BACKGROUND

A. Field of the Invention

This invention generally relates to apparatus and methods concerning portable entertainment systems.

B. Description of Related Art

While baseball is considered America's pastime, tailgating has become America's "pass time." Those critical minutes between getting your ideal parking space and the start of your favorite sporting event has become an event in itself. Planning is critical for a successful tailgate party and time is of the essence.

A proper tailgate party generally requires various elements to create the perfect balance that touch all your senses. These elements may include: a grill that provides a smoky, seared meat smell that is the true essence of a tailgating experience; a cooler that stores your beverage of choice in a frigid ice bath that tingles your hand, excites the taste buds and ultimately empowers you to do anything it takes to root for your favorite team; a sound system that drowns out the repetitive thump of the bag toss game your lot neighbors are playing, and fills the air with energy that literally makes your chest thump; a High Definition (HD) television, which catches the eye from any distance as highlights from past games scroll across the screen leading to intense discussion regarding the outcome of the upcoming event; and, a power source which is the true central nervous system of the party, which keeps the party rocking in its own quiet, unimposing way, like a coach simply watching things unfold from the sideline providing the small bursts of energy at all of the critical moments.

In short, tailgating party is its own small ecosystem, which requires planning, efficiency and execution if it is to be done right. Without these elements, the ecosystem will die. Many times at least one of these core elements is compromised to support another.

One known problem is the time it takes to set-up, teardown and secure the various implements required; grills, TVs, tables, chairs, stereo systems, etc. Another problem is that such implements take up valuable indoor vehicle space for the vehicle driven to and from the event, meaning fewer persons can ride in the same vehicle. Keeping such implements in the vehicle also may increase unwanted odor in the vehicle. Yet another problem is the outdoor space required to haul and use the implements once at the parking location. Often the requirement for additional outdoor space forces the users to park in areas of the parking lot that use extra-large parking spaces. Such extra-large parking spaces typically are farther from the event than would otherwise be necessary and/or may increase the cost to park.

To overcome these various problems, the inventors introduce the portable entertainment system of this invention, currently referred to as T.E.A.M.S. (Tactical Entertainment Advanced Media System). T.E.A.M.S. is a platform that combines all of the essential elements for a successful tailgate party into one sleek and ultra-efficient package; that is well-organized and super-efficient—because every minute counts in America's "pass time."

II. SUMMARY

According to some embodiments of this invention, portable entertainment system may comprise: (A) a housing that: (1) comprises an outer surface and an interior; and, (2) is adjustable between: (a) a storage condition where the interior is not accessible; and, (b) a use condition where the interior is accessible; (B) a television that comprises a monitor that: (1) is adjustable between: (a) a first position within the housing interior; and, (b) a second position outside the housing interior; (2) is supported to the housing when in the first and second positions; and, (3) is operable when in the second position for television viewing; and, (C) a first table that: (1) comprises a tabletop surface; (2) comprises at least one table leg; and, (3) is adjustable between: (a) a first condition where the first table forms a first portion of the housing outer surface when the housing is in the storage condition; and, (b) a second condition where the at least one table leg supports the tabletop surface to an associated ground surface.

According to other embodiments of this invention, a method of using a portable entertainment system may comprise the steps of: (A) providing a portable entertainment system that comprises: a housing that comprises an outer surface and an interior; a television that comprises a monitor that is supported to the housing and a television adjustment mechanism that is supported to the housing; and, a first table that: (1) comprises a tabletop surface; (2) comprises at least one table leg; and, (3) forms a first portion of the housing outer surface; (B) adjusting the housing from a storage condition where the interior is not accessible to a use condition where the interior is accessible; wherein step (B) comprises the step of removing the first table from the housing; (C) adjusting the first table to a condition where the at least one table leg supports the tabletop surface to an associated ground surface; and, (D) operating the television adjustment mechanism to adjust the television monitor from a first position within the housing interior to a second position outside the housing interior where the television is operable for viewing the television monitor.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein:

FIG. 17 illustrates various accessory components that may be stored within a storage area defined within a portable entertainment system.

IV. DETAILED DESCRIPTION

Figure 1:
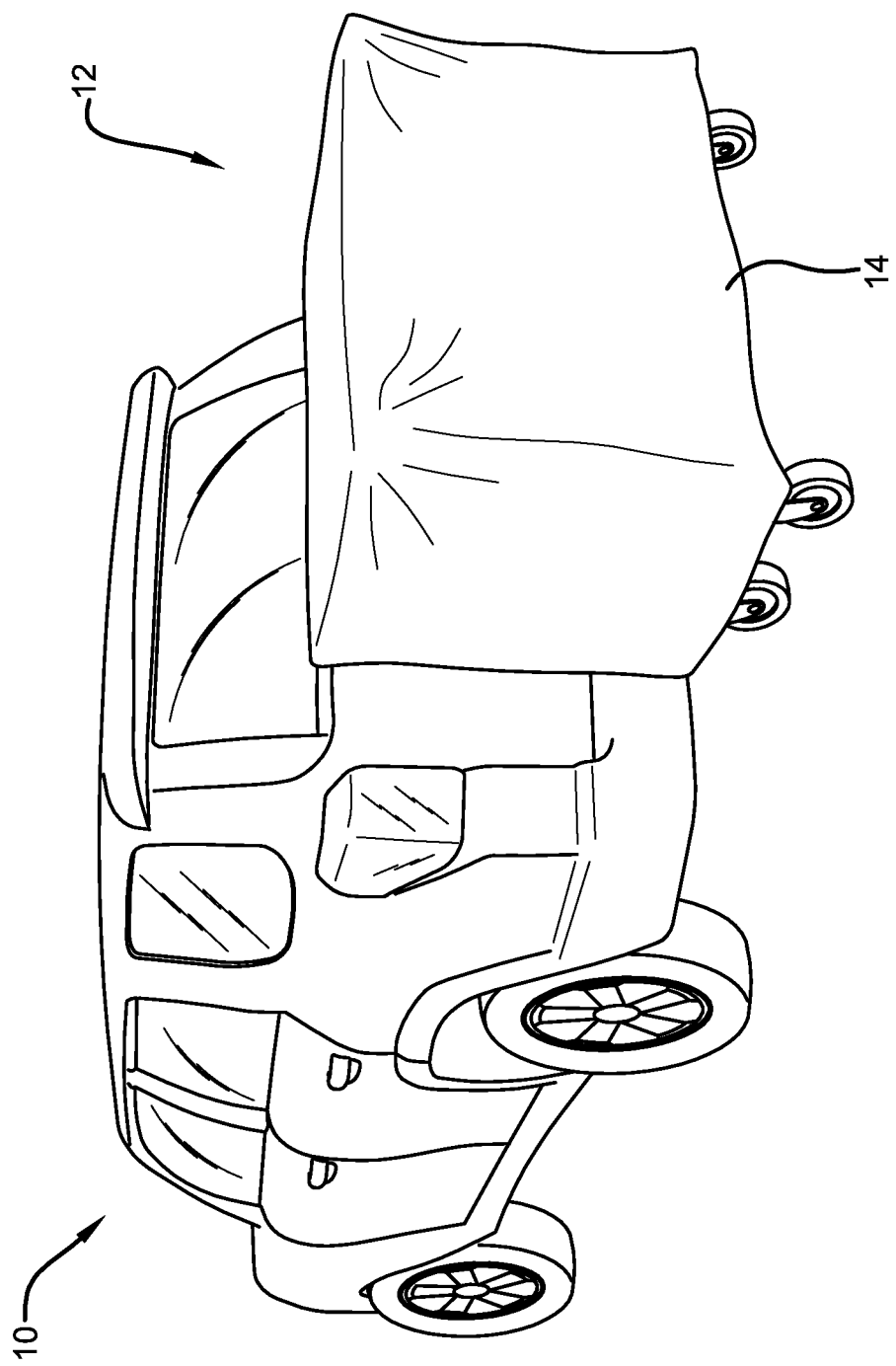
FIG. 1 is a perspective back view of a vehicle carrying a first entertainment system according to some embodiments of this invention.
Figure 2:
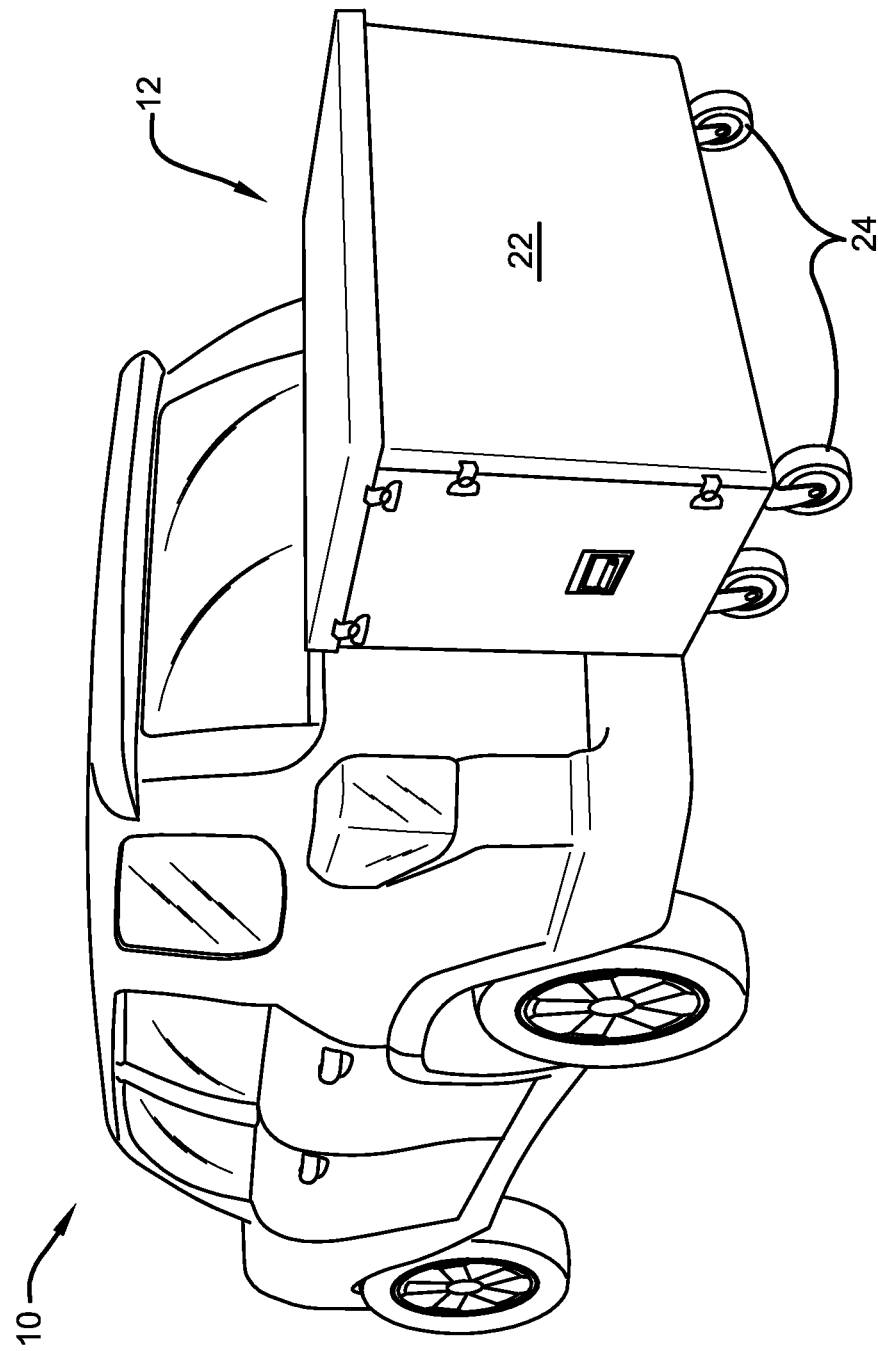
FIG. 2 is a view similar to that shown in FIG. 1 but with the cover removed from the entertainment system.

Referring now to the drawings wherein the showings are for purposes of illustrating embodiments of the invention only and not for purposes of limiting the same, and wherein like reference numerals are understood to refer to like components, FIGS. 1 and 2 show a vehicle 10 supporting, for transportation, a portable entertainment system 12 according to some embodiments of this invention. It should be noted that while the portable entertainment system 12 disclosed is well suited for use in tailgating activities, it may be used in other applications as well, including but not limited to camping activities, workplace meetings, school functions and church gatherings. FIG. 1 shows the portable entertainment system 12 protected with a cover 14 which may be used, for example, when transporting the portable entertainment system 12. FIG. 2 shows the portable entertainment system 12 with the cover 14 removed.

Figure 3:
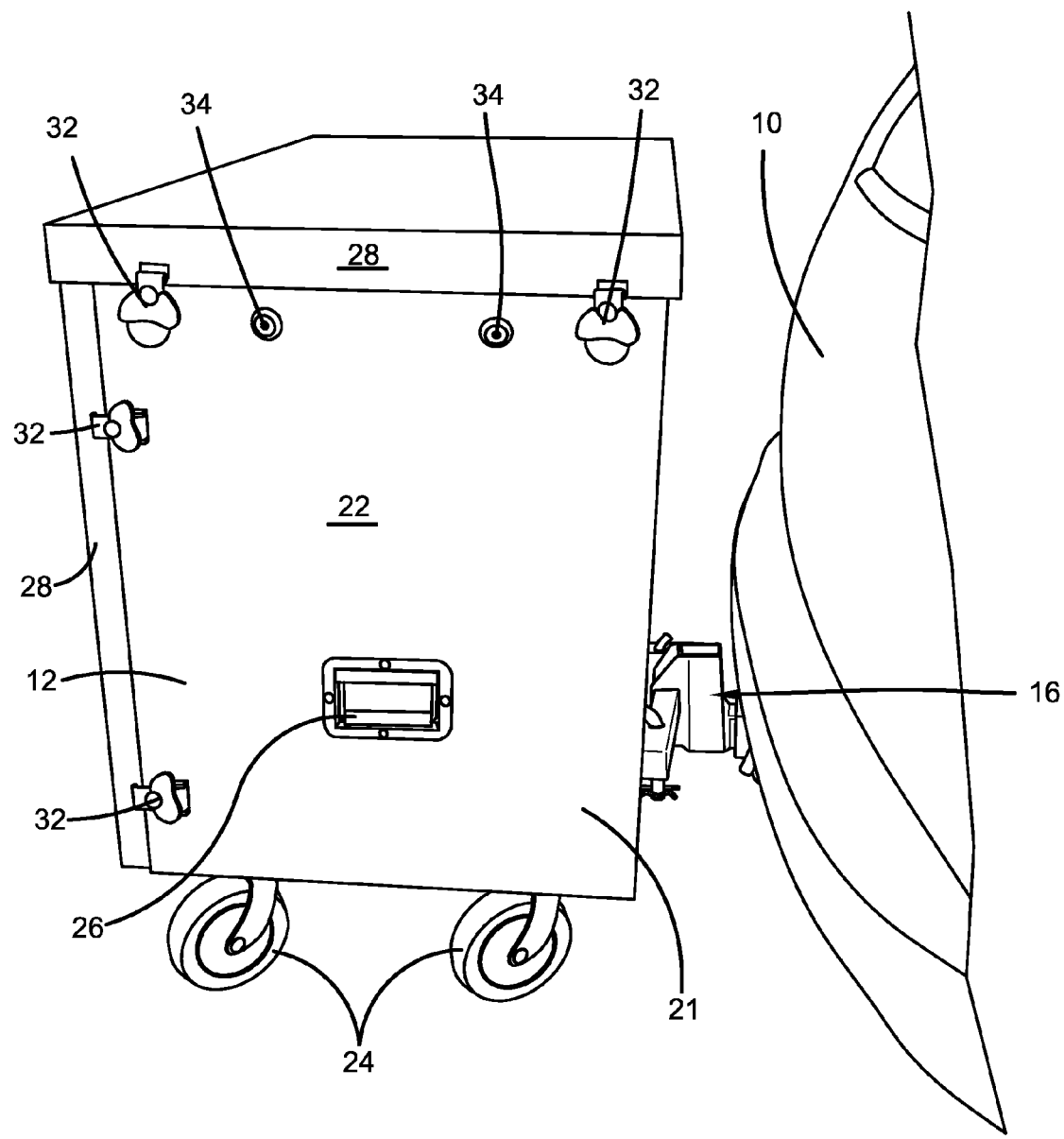
FIG. 3 is a side view of the entertainment system and vehicle shown in FIG. 2.
Figure 4:
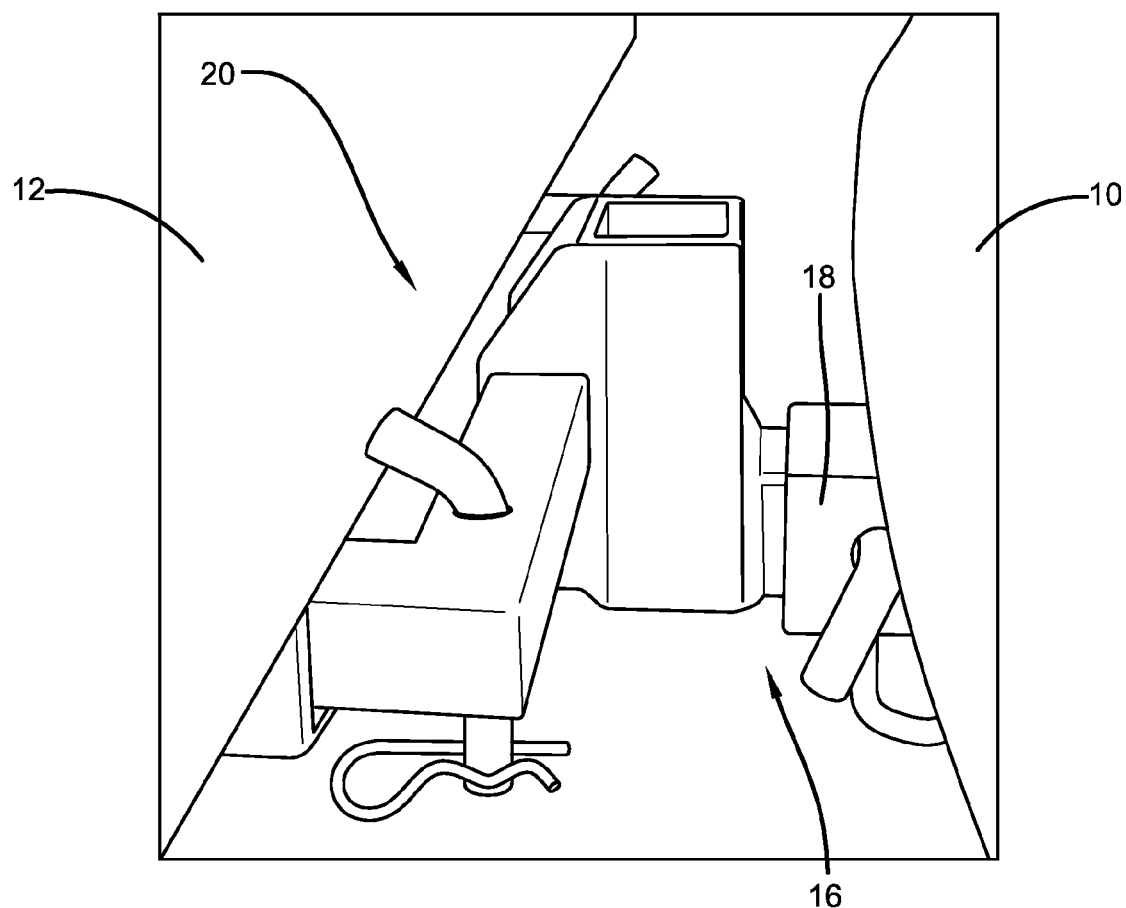
FIG. 4 is a close-up view of a hitch mount which may be used to mount the first entertainment system to a vehicle.

With reference now to FIGS. 3-4, an attachment device 16 may be used to attach the entertainment system 12 to the vehicle 10. For the embodiment shown, the attachment device 16 is a hitch mount 20 supported to the housing 22 that attaches to and thus supports the portable entertainment system 12 to the vehicle's hitch 18. The hitch mount 20, which may be a slide over hitch mount as shown, may be used to quickly and easily remove the entertainment system 12 from the hitch 18 and to attach the entertainment system 12 to the hitch 18. It should be noted that the entertainment system 12 may remain above the ground when it is transported, as shown, which means a trailer is not required.

With reference now to FIGS. 2, 3, 5 and 6, the portable entertainment system 12 may include a housing 22 that protects the internal components stored within the housing 22. The housing 22 may comprise an outer surface 21 and an interior 23 (visible in FIG. 6). The housing may be adjusted between a storage condition where the interior is not accessible (shown in FIGS. 2, 3 and 5) and a use condition where the interior 23 is accessible (shown in FIG. 6). The housing 22 may have a top 19 and a bottom 25. Note that the top 19 and the bottom 25 of the housing 22 remain the same whether the housing 22 is in the storage condition or the use condition. The housing 22 may have a box-like shape, as shown, including four sides in addition to the top and the bottom. Other shapes may be used as well.

With continuing reference to FIGS. 2, 3, 5 and 6, one or more wheels 24 (four shown), which may be castors, may be attached to the housing 22 to make it easy to roll the portable entertainment system 12 along a ground surface on location. Note that in one embodiment the wheels 24 are permanently mounted to the housing 22. In another embodiment, the wheels 24 are selectively attachable to and detachable from the housing 22. Handles 26 may be provided on the housing 22 to provide a grip surface when rolling the portable entertainment system 12 or to carry the portable entertainment system 12, as desired.

FIGS. 10-13 show a portable entertainment system 112 according to other embodiments. Portable entertainment system 112 may be attached to a vehicle similar to portable entertainment system 12 described above. Portable entertainment system 112 may include a housing 122 that has an outer surface 121, an interior 123 (visible in FIG. 12), a top 119 and a bottom 125. The housing 122 may be adjusted between a storage condition where the interior is not accessible (shown in FIG. 10) and a use condition where the interior 123 is accessible (shown in FIGS. 11, 12 and 13). One or more wheels 124 (four shown), which may be castors, may be selectively attachable to and detachable from the housing 122 to make it easy to roll the portable entertainment system 112 along a ground surface on location. Handles, not shown, may be provided on the housing 122 to provide a grip surface when rolling the portable entertainment system 112 or to carry the portable entertainment system 112, as desired.

Figure 8:
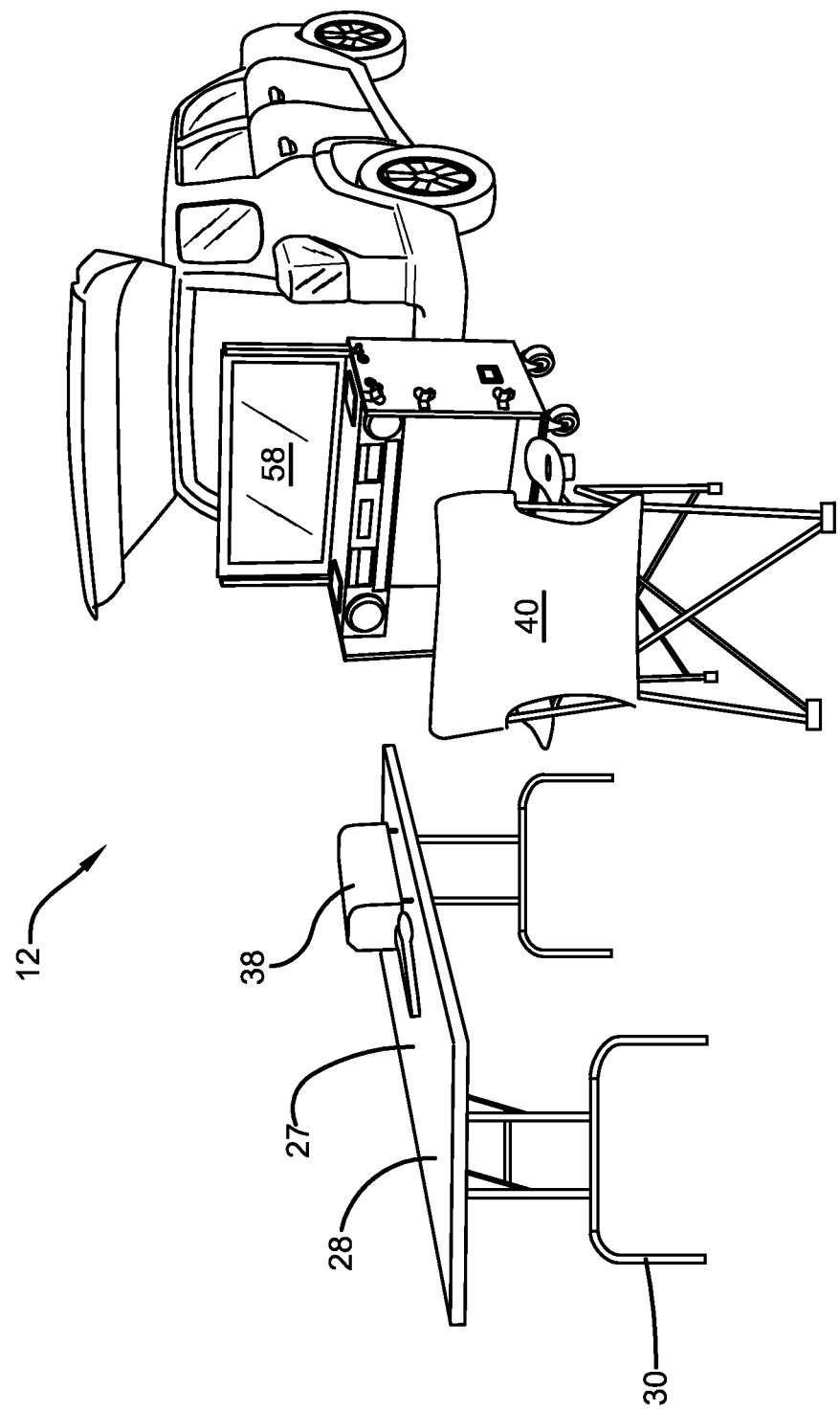
FIG. 8 is a perspective view of the first entertainment system in use with accessory components set up.
Figure 9:
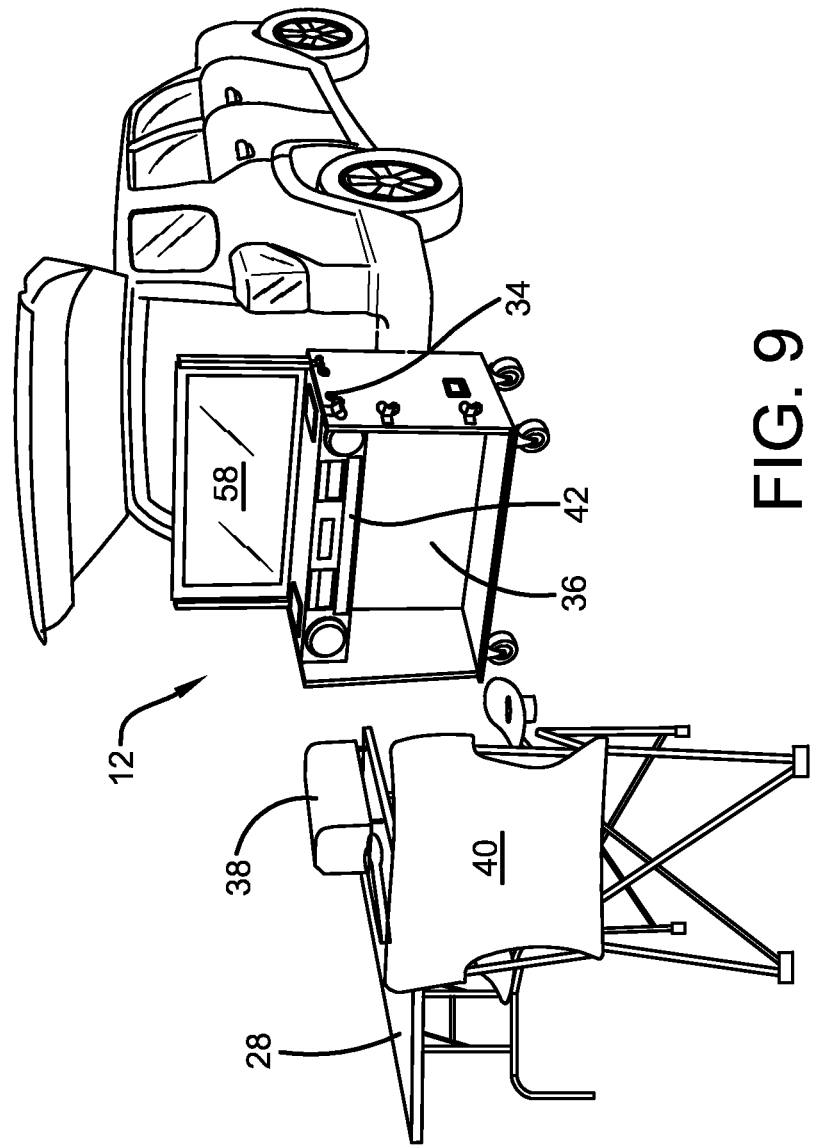
FIG. 9 is a view similar to that shown in FIG. 8 but from a slightly different angle.
Figure 14:
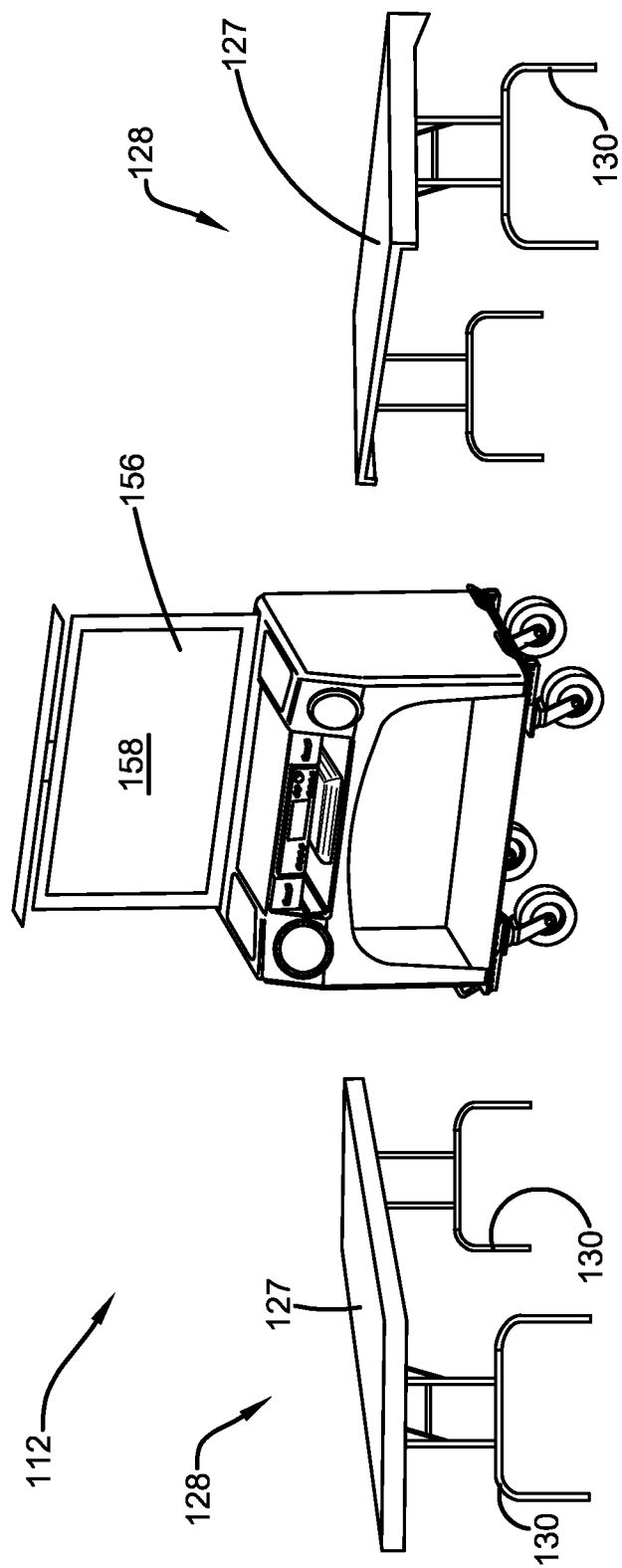
FIG. 14 shows the second entertainment system positioned between a pair of tables.
Figure 15:
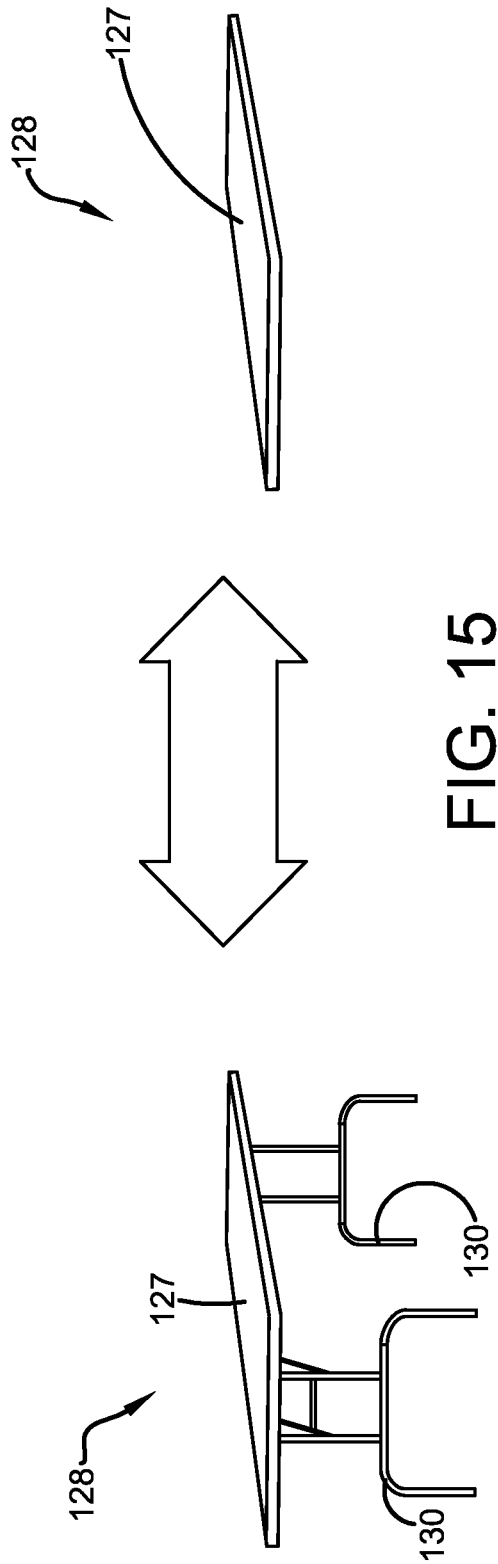
FIG. 15 illustrates how a table can be adjusted between a first condition where it can be used to define a portion of the housing and a second condition where it is used in a typical known manner.

With reference now to FIGS. 8-9 and 14-15, each portable entertainment system 12, 112 may include at least one table 28, 128. Each table 28, 128 may include a tabletop surface 27, 127 and at least one table leg 30, 130. For the embodiments shown, each table 28, 128 includes multiple table legs 30, 130 that support the corresponding tabletop surface 27, 127 to a ground surface as shown in FIGS. 8, 9 and 14. The table legs 30, 130 may be foldable with respect to the corresponding tabletop surface 27, 127 between a folded condition shown on the right-hand side of FIG. 15 (the legs are not visible because they are positioned just below the tabletop surface 127) and an unfolded condition shown on the left-hand side of FIG. 15 and in FIGS. 8, 9 and 14. As the adjustment of table legs between folded and an unfolded conditions are well known to those of skill in the art, no further details will be provided here. In the specific embodiments shown, each portable entertainment system 12, 112 includes two tables 28, 28, and 128, 128. In one embodiment, shown with regard to portable entertainment system 12, each table 28, 28 is substantially identical and therefore interchangeable when used to form the housing 22 as will be described below. In another embodiment, shown with regard to portable entertainment system 112, the tables 128, 128 are at least partially distinct and therefore better adapted for a particular location on the housing 122. This distinction is best seen by comparing the table on the left hand side of FIG. 14 with the table on the right-hand side of FIG. 14

With reference now to FIGS. 3, 5, 8, 9, 10 and 14, in one embodiment, at least one of the tables 28, 128 may be adjustable between a first condition where it forms a portion of the corresponding housing 22, 122 outer surface 21, 121 when the housing 22, 122 is in the storage condition (shown in FIGS. 3, 5 and 10); and, a second condition where the at least one table leg 30, 130 supports the corresponding tabletop surface 27, 127 to a ground surface (shown in FIGS. 8, 9 and 14). When the table 28, 128 is in the first condition it may also be in the previously described folded condition and when the table 28, 128 is in the second condition it may be in the previously described unfolded condition. In one specific embodiment, shown, when the table 28, 128 is in the first condition it's table leg(s) 30, 130 is positioned within the housing interior 23, 123 and its tabletop surface 27, 127 forms a portion of the housing outer surface 21, 121. Thus, when the table leg(s) 30, 130 are in the folded condition, the table 28, 128 is suitable to be placed into the first condition and to be removed from the housing 22, 122 and when the table leg(s) 30, 130 are in the unfolded condition, the table 28, 128 is suitable to be placed into the second condition. In another embodiment, shown, each housing outer surface 21, 121 has one portion defined by one table 28, 128 and a second portion defined by a second table 28, 128 when the housing 22, 122 is in the storage condition. In one specific embodiment, shown in FIGS. 3, 5 and 10, one table defines an upper portion of the housing 22, 122 and a second table defines a side portion of the housing 22, 122. In other embodiments, one, two or more tables could be used to define any portion of the housing outer surface 21, 121 chosen by a person of skill in the art.

With reference now to FIGS. 2-3, 5 and 9, one or more latches 32 may be positioned on outer surfaces of the tables 28, 28 and the rest of the housing 22 so that the tables 28 can be easily removed and reattached from the housing 22. For the embodiments shown, each door has two latches 32 positioned on opposite ends of the door to secure the tables 28, 28 to the housing 22. One or more locks, not shown, may be used with one or more of the latches 32 to safely secure the portable entertainment system 12 while in the storage condition. The components within the housing 22 may require electric power, control or other needs requiring external wiring. To meet this requirement, electric connectors 34 (see FIGS. 3 and 9) may be positioned where desired on the housing 22, as shown. While not shown, the embodiments of FIGS. 10-15 may similarly use handles, latches, locks and electric connectors.

Figure 10:
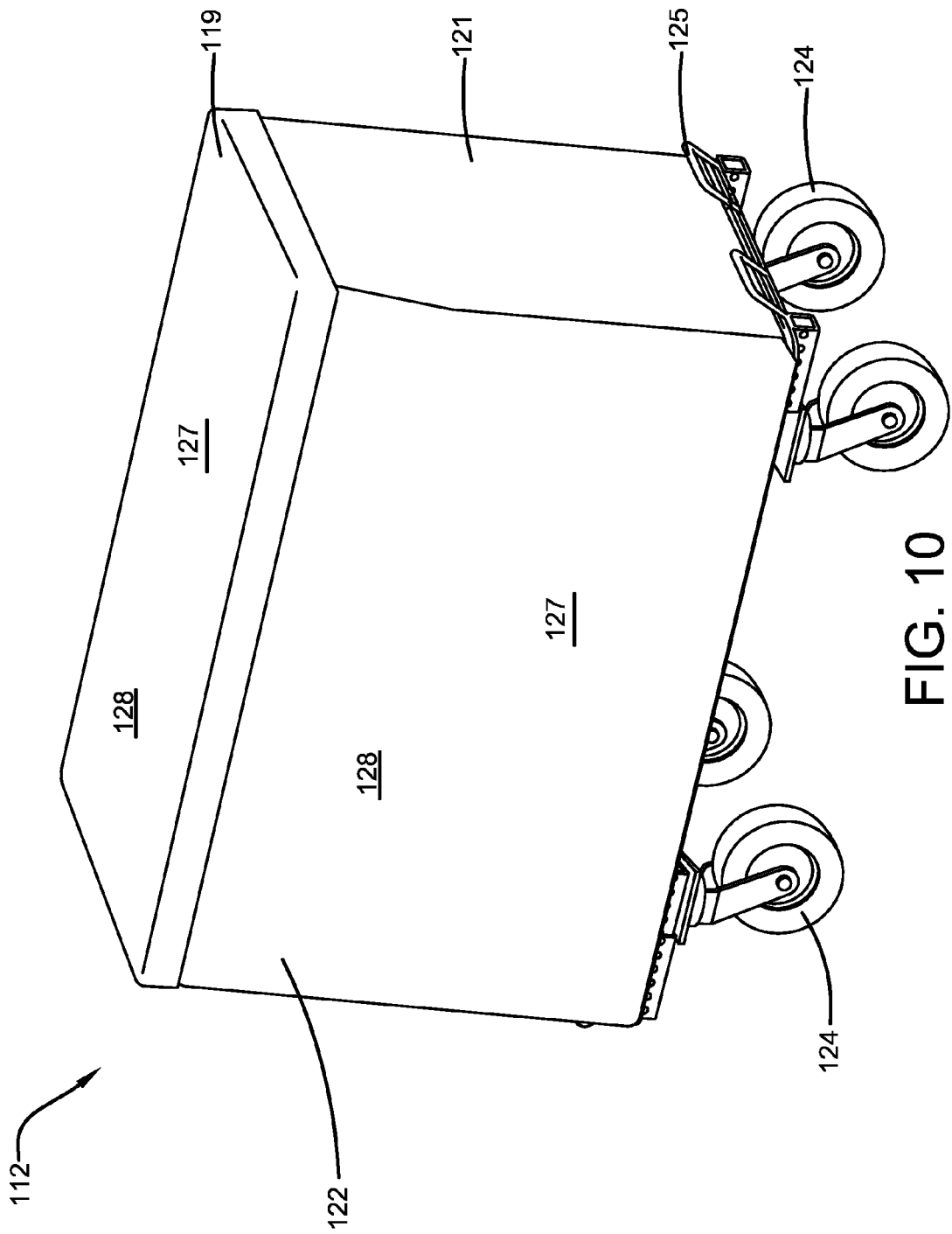
FIG. 10 is a perspective view of a second entertainment system according to some embodiments of this invention.
Figure 11:
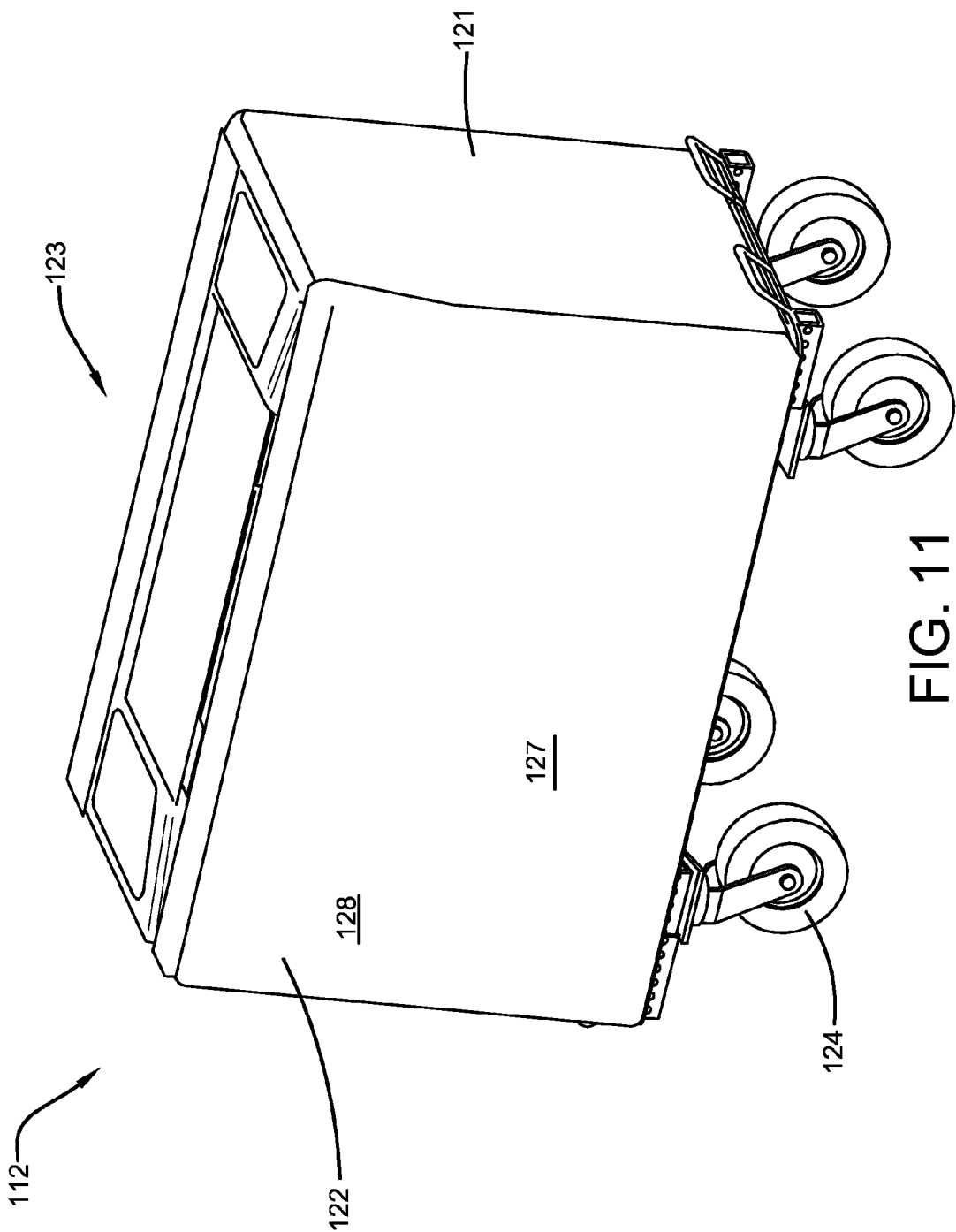
FIG. 11 is a view similar to that shown in FIG. 10 but with one of the tables removed from the housing.
Figure 12:
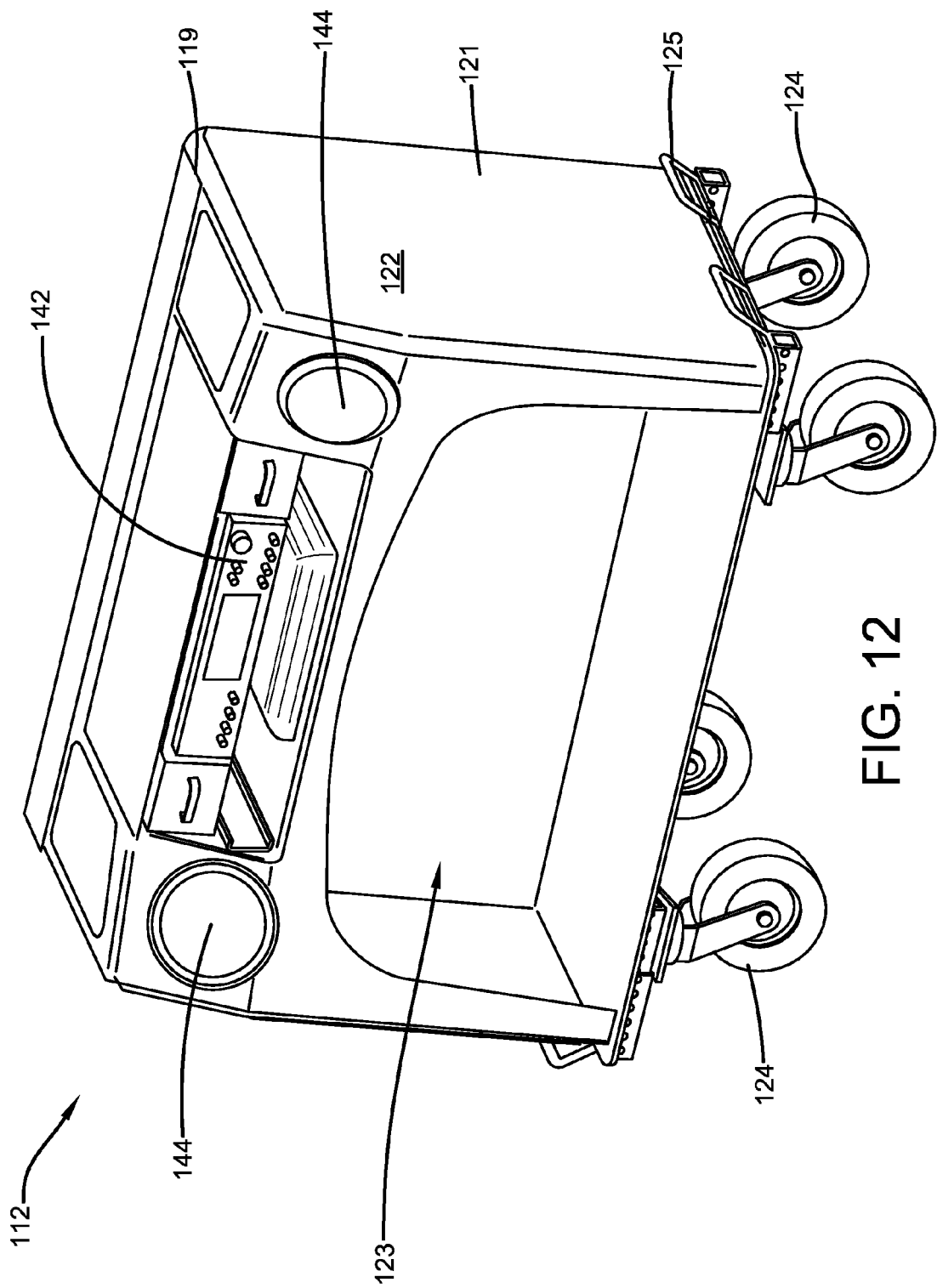
FIG. 12 is a view similar to that shown in FIG. 11 but with both tables removed from the housing.
Figure 13:
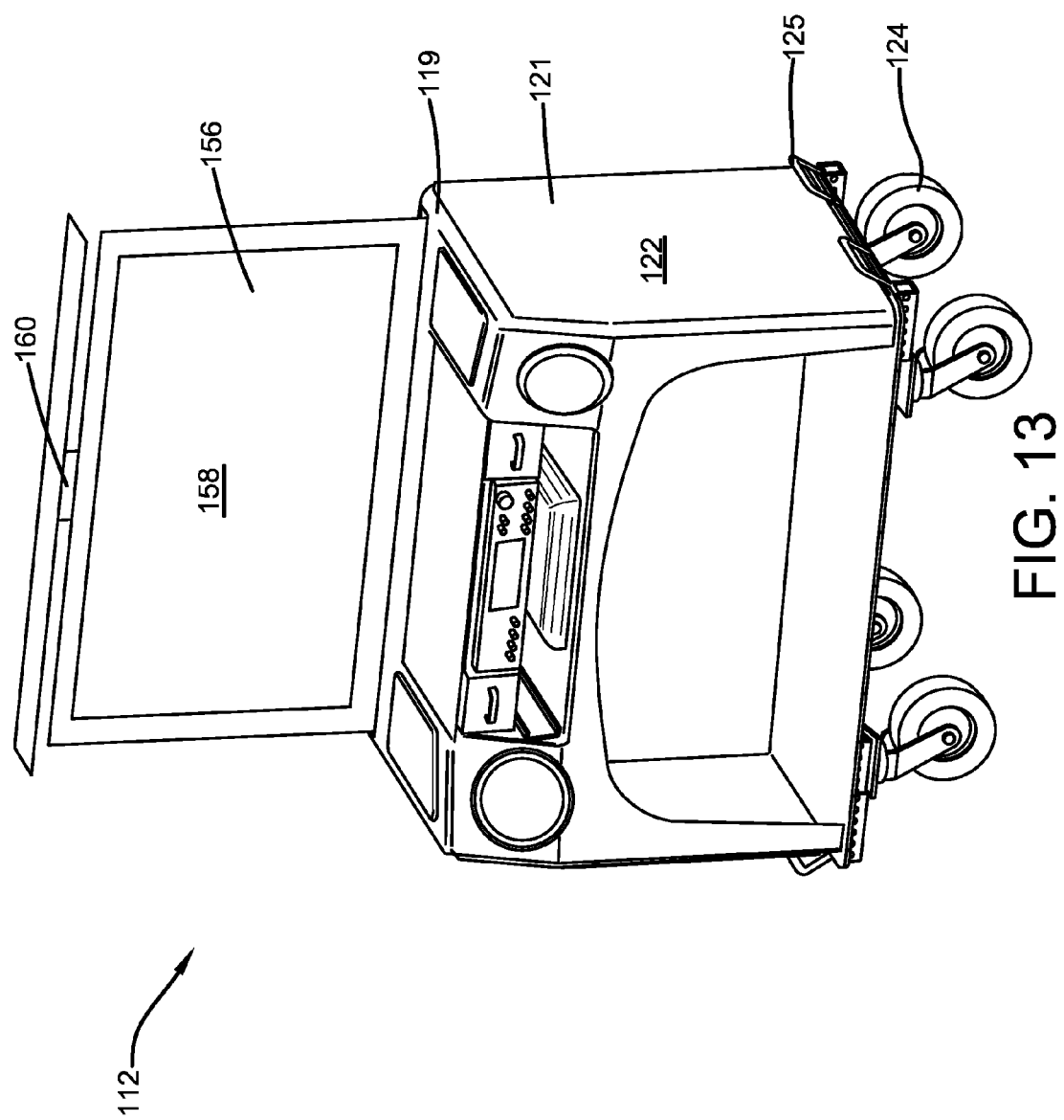
FIG. 13 is a front view of the second entertainment system showing the television monitor extended out of the housing interior.

With reference now to FIGS. 6-9 and 11-14, once the housing 22, 122 is adjusted into the use condition where the interior 23, 123 is accessible, other features of the portable entertainment system 12, 112 can be used. FIG. 11 shows the housing 122 with one of the tables 128 (the table forming an upper portion of the housing) removed (compare to FIG. 10) and thus the interior 123 is accessible. FIG. 12 shows the second table 128 (the table forming a side portion of the housing) removed (compare to FIG. 11) and thus more of the interior 123 is accessible. FIGS. 12-14 show the housing 122 with both tables 128 removed. Similarly FIGS. 6-9 show the housing 22 with both tables 28 removed.

With reference now to FIGS. 5-9, 10-14 and 16, the portable entertainment system 12, 112 may include a television 56, 156 that includes a monitor 58, 158. The television monitor 58, 158 may be adjustable between a first position within the housing interior 23, 123 (as shown in FIGS. 5 and 10-12) and a second position outside of the housing interior 23, 123 (as shown in FIGS. 6-9 and 13-14). When in the second position, the television monitor 58, 158 is operable for television viewing as is well known to those of skill in the art. Note that the television monitor 58, 158 may be supported to the housing 22, 122 both when the television monitor 58, 158 is in the first position and when in the second position. In one embodiment, the television monitor 58, 58 is adjusted between the first and second positions manually. In another embodiment, shown, the television monitor 58, 58 is adjusted between the first and second positions with the use of an adjustment mechanism 57, 157 that is supported to the housing 22, 122. The adjustment mechanism 57, 157 may be of any type chosen by a person of skill in the art. In one embodiment, the adjustment mechanism 57, 157 is an electric motor which operates a telescoping cylinder to raise and lower the television monitor 58, 158 into and out of the housing interior 23, 123. In one embodiment, shown in FIG. 6, the television monitor 58 moves up and down on slides 60 which are positioned on opposite sides of the television monitor 58. In another embodiment, shown in FIG. 13, the television monitor 158 moves up and down on a slide 160 which is positioned in the middle of the television monitor 158 on the back. In one embodiment, the television 156 may include a satellite system 155. In another embodiment, the television 56, 156 is a High Definition (HD) television.

With reference now to FIGS. 6-7, 12 and 16, the portable entertainment system 12, 112 may include a stereo sound system 42, 142 that includes at least one speaker 44, 144 (two shown) and that is supported to the housing 22, 122. In one embodiment, shown, the two speakers 44, 144 are positioned on opposite sides of the housing 22, 122 to provide optimal sound for the listeners. The stereo sound system 42, 142 may include a radio 46, 146, a CD player 48, 148 and a DVD player 149. Other sound system components can also be used. The particular stereo sound system used can be any type chosen by a person of skill in the art. In one embodiment, shown, the stereo sound system 42, 142 is positioned on the top of the housing 22, 122. In another embodiment, also shown, the television monitor 58, 158 extends above the stereo sound system 42, 42 when the television monitor 58, 158 is in the second position. The stereo sound system 42, 142 may be supported to the housing 22, 122. In a more specific embodiment, shown, the stereo sound system 42, 142 may be integrated into the housing 22, 122. Here by integrated it is meant that the stereo system may remain mounted to the housing.

With reference now to FIGS. 6-9, 12 and 16-17, the portable entertainment system 12, 112 may include a work surface 50, 150 that may be used for storing items, displaying items and/or preparing items such as food items. In one embodiment, shown, the work surface 50, 150 is positioned above the stereo sound system 42, 142. A storage area 36, 136 may also be incorporated within the housing 22, 122. The storage area 36, 136 may be positioned below the stereo sound system 42, 142 and above the bottom of the housing 22, 122. While the storage area 36, 136 may be of any size chosen by a person of skill in the art, for the embodiment shown it is relatively large having a volume of at least 6 cubic feet. As a result, the storage area 36, 136 provides plenty of room for accessory components that may be used with the portable entertainment system 12, 112. Non-limiting examples include, as shown in FIGS. 8-9 and 17, a cooler 137 a grill 38, 138 a power generator 139 and one or more chairs 40.

Figure 6:
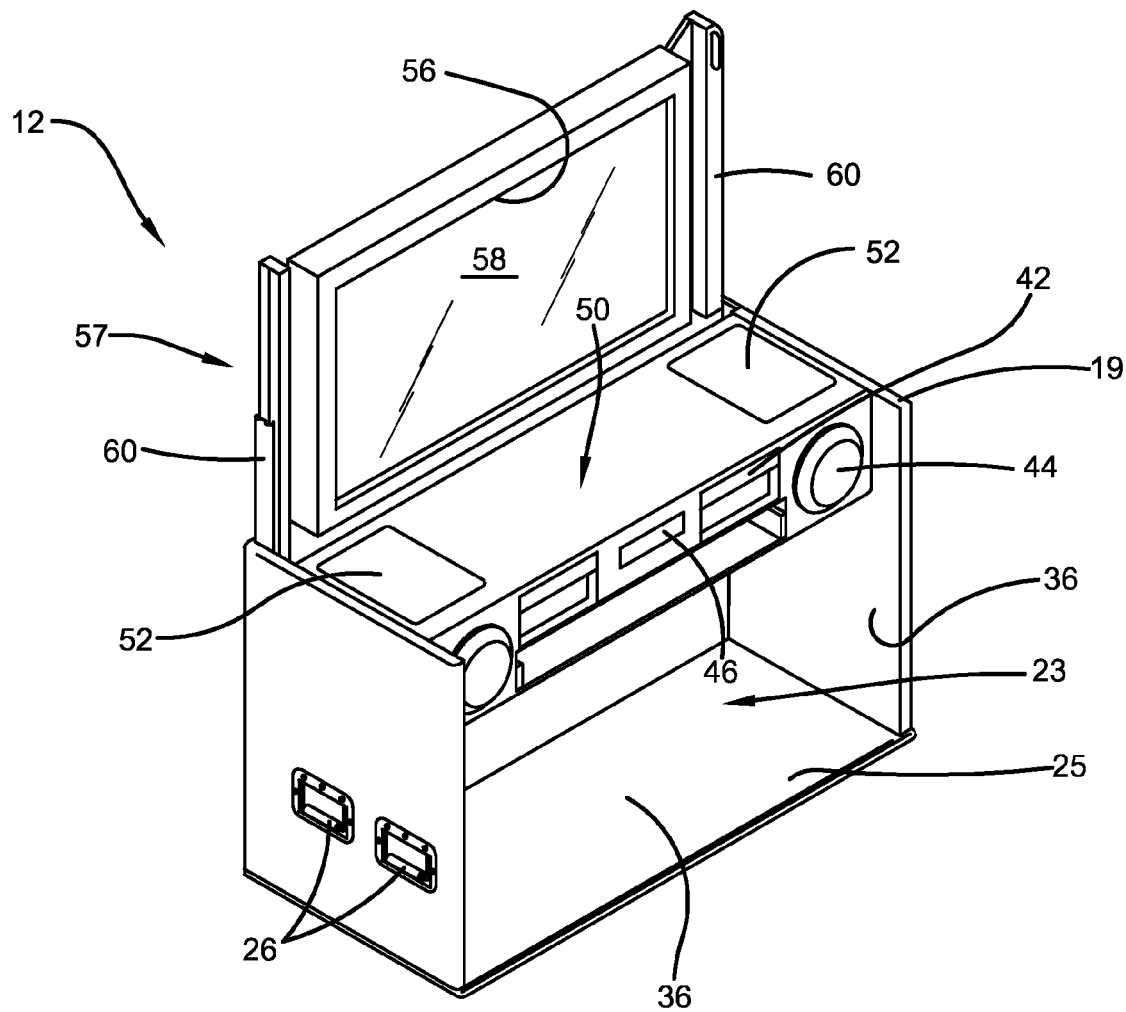
FIG. 6 is a perspective view of the first entertainment system in an open or use condition.
Figure 7:
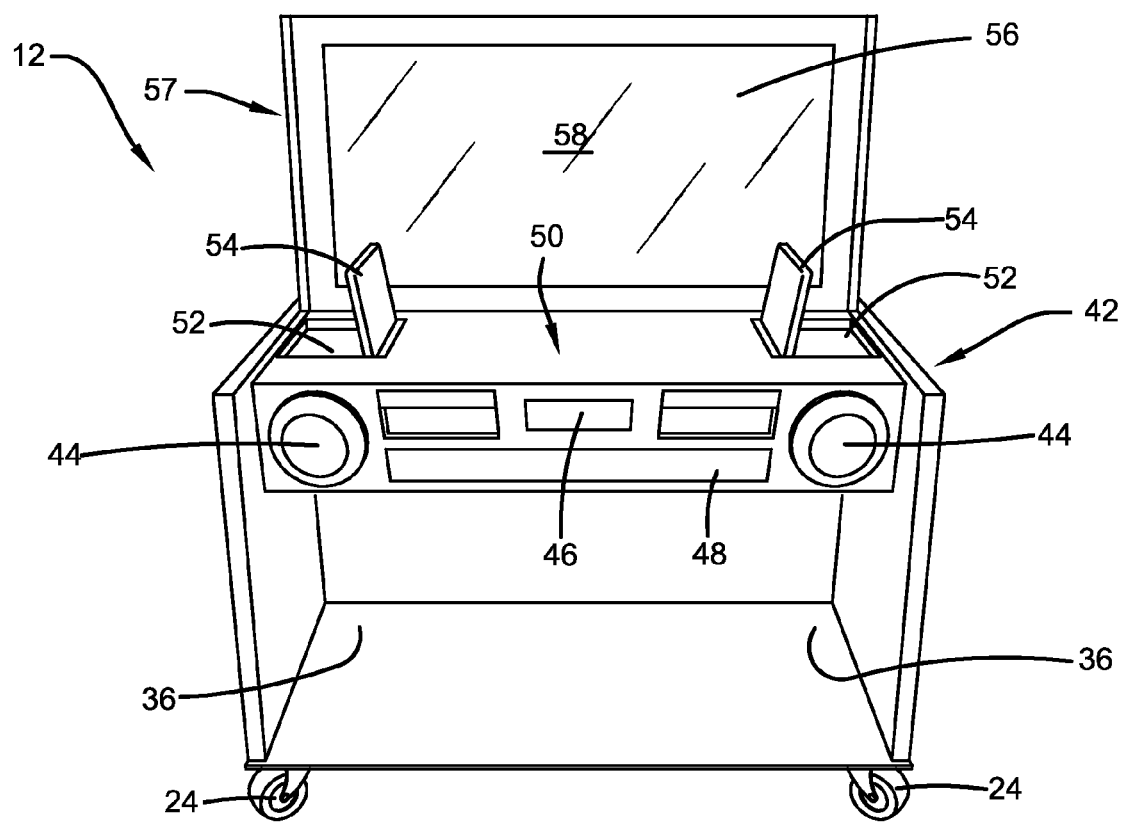
FIG. 7 is front view of the first entertainment system in an open or use condition.
Figure 16:
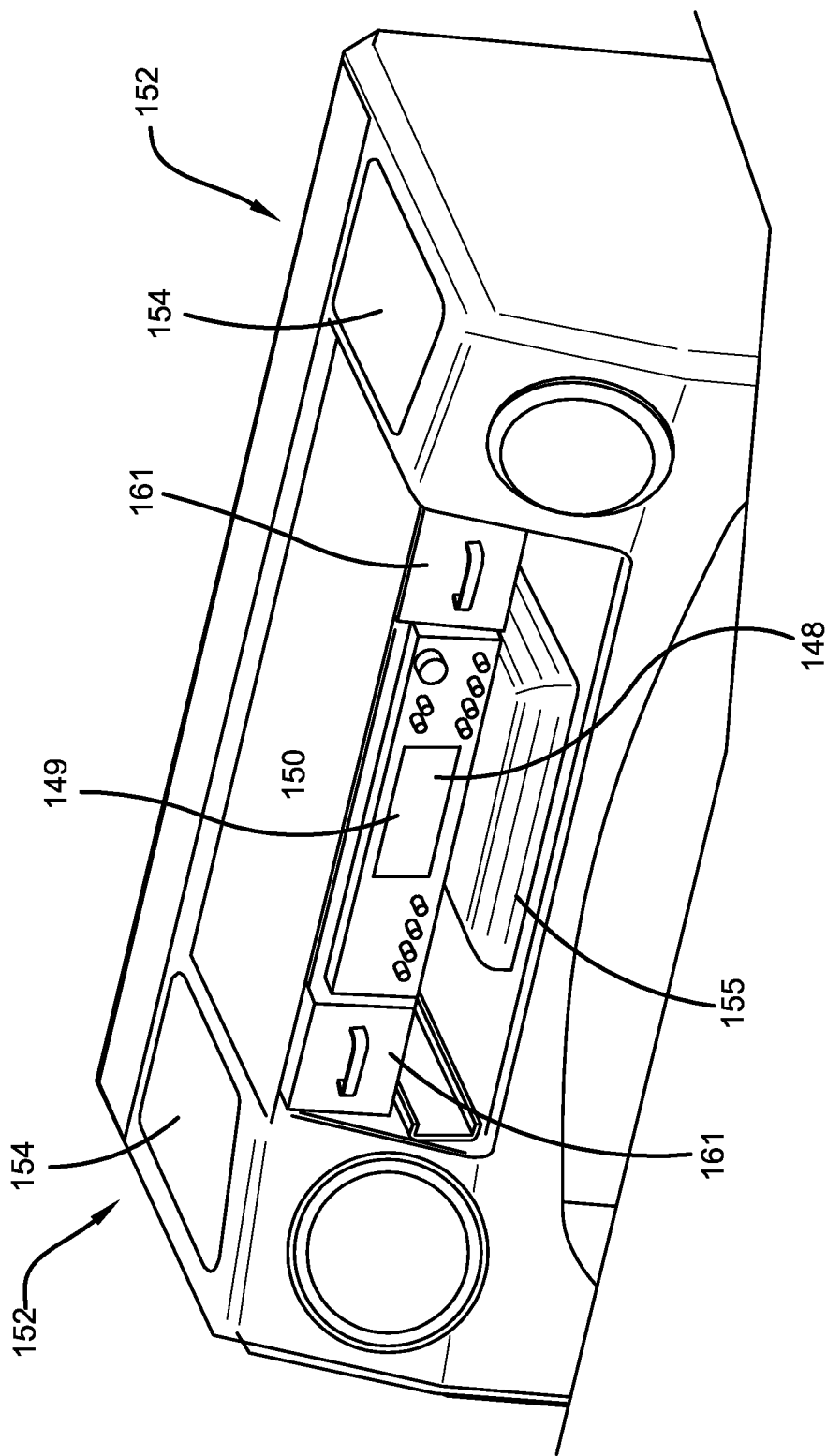
FIG. 16 is a close up view of a portion of the second portable entertainment system shown in FIG. 12.

With reference now to FIGS. 6-7 and 16, any number of storage compartments 52, 152 may conveniently be positioned on the portable entertainment system 12, 112. In one embodiment, shown, a pair of storage compartments 52, 52, 152, 152 are positioned on and accessible from the corresponding work surface 50, 150. Each storage compartment 52, 152 may have a selectively openable and closable lid 54, 154 as shown. When closed, the outer surfaces of the lids may be substantially co-planar with the work surface 50, 150. In this way the work surface 50, 150 can include the outer surfaces of the lids 54, 154 when they are closed. The lids 54, 154 may pivot between open and closed positions, as shown. For the embodiments shown, the storage compartments 52, 152 serve as coolers but other uses are also contemplated. Additional storage compartments, such as those shown at 161, 161 in FIG. 16, may be selectively openable drawers.

The ease and speed with which the portable entertainment system 12, 112 of this invention can be used is greatly improved over previously known entertainment systems. Portable entertainment system 12 may begin in the condition shown in FIG. 1; attached to a vehicle 10 where it can be transported to its usage position. Portable entertainment system 112 shown in FIG. 10 may be similarly transported. Once at the usage designation the cover 14, if used, may be removed as shown in FIG. 2. At this point, the user may detach the portable entertainment system 12 from the vehicle 10 or may instead begin adjusting the housing 22 from the storage condition into a use condition. Note that in some embodiments the wheels 24 may be pre-attached to the housing 22 as shown while in an alternate embodiment they may remain detached from the housing 22 or may be attached at this time. In any case, the housing 22, 122 may be transported (with wheels or without) to the desired usage location.

Figure 5:
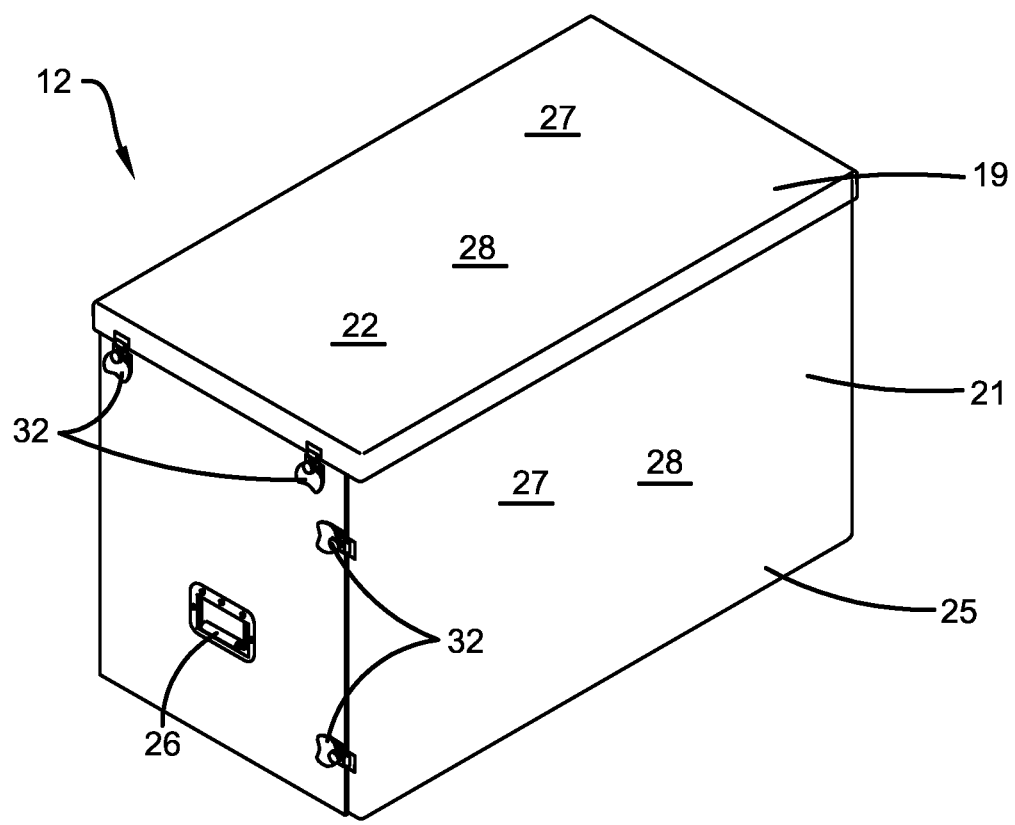
FIG. 5 is a perspective view of the first entertainment system in a closed or storage condition.

With the housing 22, 122 in the storage condition where the interior 23, 123 is not accessible, as shown in FIGS. 5 and 10, the user may decide to adjust the housing 22, 122 into a use condition where the interior 23, 123 is accessible. In one embodiment, this adjustment includes the step of removing at least one of the tables 28, 128 from the housing 22, 122. If latches 36 (and/or a lock) is used it must be unlatched (and/or unlocked) before the table 28, 128 can be removed from the housing 22, 122. FIG. 11 shows housing 122 with the table 128 that formerly defined an upper portion of the outer surface 121 of the housing 122 removed. In some embodiments, the adjustment also requires the removal of a second table 128 as shown in FIG. 12. Once each table 28, 128 is removed, it may be adjusted into a condition where the corresponding table leg 30, 130 supports the tabletop surface 27, 127 to a ground surface as shown in FIGS. 8, 9 and 14 and positioned to a desired location. In one embodiment, this adjustment of the table 28, 128 includes unfolding the table legs from the condition shown on the right-hand side of FIG. 15 to the unfolded condition shown on the left hand side of FIG. 15.

With reference now to FIGS. 6, 8-9 and 12, 14 and 17 at this point, any accessory components positioned within the storage area 36, 136 (such as chairs 40, a grill 38, 138 a cooler 137 and/or a power generator 139) can be easily removed and positioned to a desired location and operated. With reference now to FIGS. 6-7 and 12-13, to use the television 56, 156 the television monitor 58, 158 may be adjusted from a first position within the housing interior 23, 123 two a second position outside the housing interior 23, 123. The television can then be operated for viewing as well known to those of skill in the art. In one embodiment, the adjustment of the television monitor 58, 158 is accomplished using the television adjustment mechanism 57, 157. The other components of the portable entertainment system 12, 112 may also be operated as well known to those of skill in the art. The inventors have discovered that the time it takes to adjust the portable entertainment system 12, 112 between the storage condition and the use condition takes 2 minutes or less when done manually by two ordinary adults at a normal, non-hurried pace. When the portable entertainment system 12, 112 is no longer required, it can be adjusted between the use condition and the storage condition by simply reversing the steps noted above. Again the time for this adjustment will take 2 minutes or less when done manually by two ordinary adults at a normal, non-hurried pace.

The materials used to construct the entertainment system 12, 112 can be any chosen with the sound judgment of a person of skill in the art. In one embodiment, the housing 22 may be formed of aluminum and steel. In other embodiments, the housing 22 may be formed of fiberglass, plastics, wood, etc.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof. Further, the "invention" as that term is used in this document is what is claimed in the claims of this document. The right to claim elements and/or sub-combinations that are disclosed herein as other inventions in other patent documents is hereby unconditionally reserved.

We claim:

1. A portable entertainment system comprising:
   a housing that: (1) comprises an outer surface and an interior; and, (2) is adjustable between: (a) a storage condition where the interior is not accessible; and, (b) a use condition where the interior is accessible;
   a television that comprises a monitor that: (1) is adjustable between: (a) a first position within the housing interior; and, (b) a second position outside the housing interior; (2) is supported to the housing when in the first and second positions; and, (3) is operable when in the second position for television viewing; and,
   a first table that: (1) comprises a tabletop surface; (2) comprises at least one table leg; (3) is adjustable between: (a) a first condition where the first table forms a first portion of the housing outer surface when the housing is in the storage condition; and, (b) a second condition where the at least one table leg supports the tabletop surface to an associated ground surface; and, (4) is removable from the housing to adjust the housing from the storage condition where the interior is not accessible to the use condition where the interior is accessible.

2. The portable entertainment system of claim 1 further comprising:
   a television adjustment mechanism that is supported to the housing and operable to adjust the television monitor between the first and second positions.

3. The portable entertainment system of claim 2 further comprising:
   a hitch mount supported to the housing that supports the portable entertainment system to an associated vehicle hitch without the use of a trailer.

4. The portable entertainment system of claim 3 further comprising:
   a stereo sound system that comprises at least one speaker and that is supported to the housing.

5. The portable entertainment system of claim 4 wherein:
   when the first table is in the first condition, the at least one table leg is positioned within the housing interior and the tabletop surface is the first portion of the housing outer surface;
   the at least one table leg is foldable with respect to the tabletop surface between a folded condition and an unfolded condition;
   wherein when the at least one table leg is in the folded condition the first table is suitable to be placed into the first condition; and,
   wherein when the at least one table leg is in the unfolded condition the first table is suitable to be placed into the second condition.

6. The portable entertainment system of claim 1 further comprising:
   a second table that: (1) comprises a tabletop surface; (2) comprises at least one table leg; (3) is adjustable between: (a) a first condition where the second table forms a second portion of the housing outer surface;

and, (b) a second condition where the at least one table leg supports the tabletop surface to an associated ground surface; and, (4) is removable from the housing to adjust the housing from the storage condition where the interior is not accessible to the use condition where the interior is accessible.

7. The portable entertainment system of claim 6 wherein:
the housing has a top, a bottom, and four sides;
the first table forms a first portion of the housing outer surface on top of the housing; and,
the second table forms a second portion of the housing outer surface on one of the housing sides.

8. The portable entertainment system of claim 6 further comprising:
a first latch that secures the first table to the housing; and,
a second latch that secures the second table to the housing.

9. The portable entertainment system of claim 6 further comprising:
first and second wheels that are selectively attachable to the housing and suitable when attached for rolling the portable entertainment system along an associated ground surface.

10. The portable entertainment system of claim 6 wherein:
the housing has a top and a bottom; and,
the stereo sound system is positioned on the top of the housing.

11. The portable entertainment system of claim 10 wherein:
when the television monitor is in the second position, it extends above the stereo sound system.

12. The portable entertainment system of claim 10 further comprising:
a storage area positioned between the stereo sound system and the bottom of the housing; and,
wherein the storage area has a volume of at least 6 cubic feet.

13. The portable entertainment system of claim 10 further comprising:
a work surface positioned above the stereo sound system;
first and second storage compartments that are accessible from the work surface.

14. The portable entertainment system of claim 13 wherein:
the first and second storage compartments each have a selectively openable and closable lid with an outer surface; and,
when the lids are closed their outer surfaces are substantially co-planar with the work surface.

15. A method of using a portable entertainment system comprising the steps of:
(A) providing a portable entertainment system that comprises:
a housing that comprises an outer surface and an interior;
a television that comprises a monitor that is supported to the housing and a television adjustment mechanism that is supported to the housing; and,
a first table that: (1) comprises a tabletop surface; (2) comprises at least one table leg; and, (3) forms a first portion of the housing outer surface;
(B) adjusting the housing from a storage condition where the interior is not accessible to a use condition where the interior is accessible by removing the first table from the housing;
(C) adjusting the first table to a condition where the at least one table leg supports the tabletop surface to an associated ground surface; and,
(D) operating the television adjustment mechanism to adjust the television monitor from a first position within the housing interior to a second position outside the housing interior where the television is operable for viewing the television monitor.

16. The method of claim 15 wherein:
step (A) comprises the step of: providing the portable entertainment system with a hitch mount that is operable to support the portable entertainment system to an associated vehicle hitch without the use of the trailer and operable to remove the portable entertainment system from the associated vehicle hitch.

17. The method of claim 15 wherein:
step (A) comprises the steps of:
providing the housing with a top, a bottom, and four sides;
providing the first table to form a first portion of the housing outer surface on top of the housing;
providing a second table that: (1) comprises a tabletop surface; (2) comprises at least one table leg; and, (3) forms a second portion of the housing outer surface on one of the housing sides; and,
the method further comprises the steps of:
removing the second table from the housing to provide access to the housing interior; and,
adjusting the second table to a condition where the at least one table leg supports the tabletop surface to an associated ground surface.

18. The method of claim 17 wherein:
step (A) comprises the step of providing: a first latch that secures the first table to the housing; and, a second latch that secures the second table to the housing;
prior to the step of removing the first table from the housing the method comprises the step of detaching the first latch; and,
prior to the step of removing the second table from the housing the method comprises the step of detaching the second latch.

19. The method of claim 18 wherein:
the steps of detaching the first latch, removing the first table from the housing, detaching the second latch, and removing the second table from the housing are accomplished manually by two adults in 2 minutes or less.

20. The method of claim 15 wherein:
step (A) comprises the step of providing the portable entertainment system with first and second wheels; and,
prior to step (D) the method comprises the steps of attaching the first and second wheels to the housing and rolling the portable entertainment system on an associated ground surface to a desired location.

* * * * *